US012623196B2

(12) United States Patent
Mattern et al.

(10) Patent No.:  US 12,623,196 B2
(45) Date of Patent:     May 12, 2026

(54) FEED SUPPLY UNIT

(71) Applicant: BASF SE, Ludwigshafen am Rhein (DE)

(72) Inventors: Jonas Mattern, Schwarzheide (DE); Johannes Buettner, Schwarzheide (DE); Ruediger Fritz, Bernsdorf (DE); Maximilian Koeller, Schwarzheide (DE)

(73) Assignee: BASF SE, Ludwigshafen am Rhein (DE)

( * ) Notice: Subject to any disclaimer, the term of this patent is extended or adjusted under 35 U.S.C. 154(b) by 560 days.

(21) Appl. No.: 18/016,991

(22) PCT Filed: Jul. 19, 2021

(86) PCT No.: PCT/EP2021/070163
§ 371 (c)(1),
(2) Date: Jan. 19, 2023

(87) PCT Pub. No.: WO2022/018034
PCT Pub. Date: Jan. 27, 2022

(65) Prior Publication Data
US 2023/0347308 A1      Nov. 2, 2023

(30) Foreign Application Priority Data

Jul. 20, 2020     (EP) .................................... 20186644

(51) Int. Cl.
*B01J 4/00*          (2006.01)
*B01J 4/02*          (2006.01)
*B01J 19/00*        (2006.01)

(52) U.S. Cl.
CPC ................. *B01J 4/008* (2013.01); *B01J 4/02* (2013.01); *B01J 19/002* (2013.01); (Continued)

(58) Field of Classification Search
CPC ... B01J 19/002; B01J 4/02; B01J 4/008; B01J 2219/00268; B01J 2219/00259; B01J 2219/0027; B01J 2204/002
See application file for complete search history.

(56) References Cited

U.S. PATENT DOCUMENTS

| | | | |
|---|---|---|---|
| 6,056,883 A | 5/2000 | Bond et al. | |
| 2014/0341783 A1* | 11/2014 | Waters | B01J 19/26 422/119 |

FOREIGN PATENT DOCUMENTS

| | | |
|---|---|---|
| CN | 102182929 A | 9/2011 |
| CN | 210146581 U | 3/2020 |
| | (Continued) | |

OTHER PUBLICATIONS

International Search Report and Written Opinion received for PCT Patent Application No. PCT/EP2021/070163, mailed on Sep. 14, 2021, 8 pages.

*Primary Examiner* — Lessanework Seifu
(74) *Attorney, Agent, or Firm* — Faegre Drinker Biddle & Reath LLP

(57) ABSTRACT

A feed supply unit comprising (a) a feed dosage unit for supplying a viscosity unstable liquid feed to a reactor, (b) a flushing unit for flushing at least a part of the feed dosage unit according to (a) with a flushing medium, and (c) a signal transmission means for transmitting a signal from a monitoring means to a control means.

13 Claims, 1 Drawing Sheet

(52) U.S. Cl.
     CPC ..................... *B01J 2204/002* (2013.01); *B01J*
                *2219/00268* (2013.01); *B01J 2219/0027*
                                          (2013.01)

(56)                    References Cited

FOREIGN PATENT DOCUMENTS

| CN | 210635399 U | 5/2020 |
| CN | 111266230 A | 6/2020 |
| WO | 2012/123469 A1 | 9/2012 |
| WO | 2012/161872 A1 | 11/2012 |

* cited by examiner

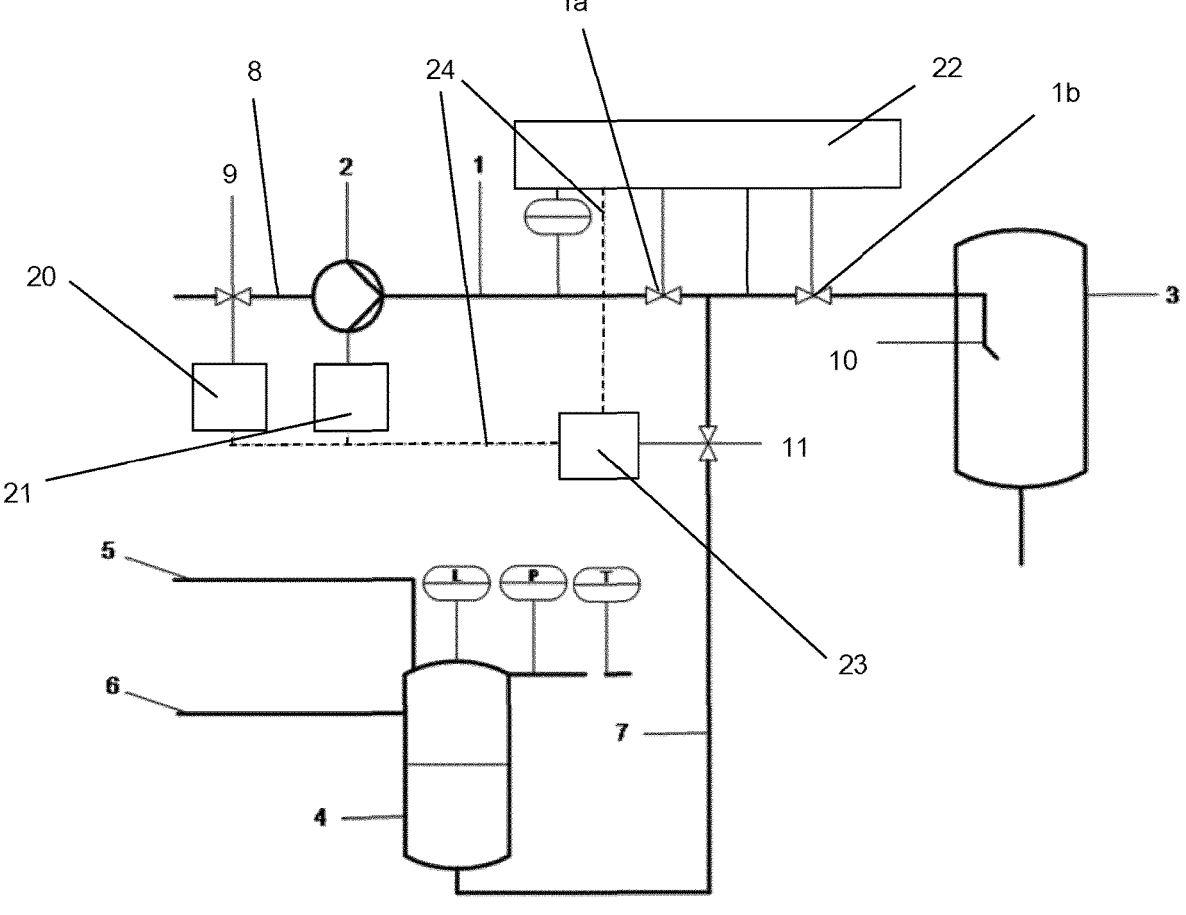

FEED SUPPLY UNIT

CROSS-REFERENCE TO RELATED APPLICATIONS

This application is a National stage application (under 35 U.S.C. § 371) of PCT/EP2021/070163, filed Jul. 19, 2021, which claims benefit of European Application No. 20186644.9, filed Jul. 20, 2020, both of which are incorporated herein by reference in their entirety.

The present invention relates to a feed supply unit comprising (a) a feed dosage unit for supplying a viscosity unstable liquid feed to a reactor, (b) a flushing unit for flushing at least a part of the feed dosage unit according to (a) with a flushing medium, and (c) a signal transmission means for transmitting a signal from a monitoring means to a control means. The present invention further relates to a chemical production unit comprising such a feed supply unit, to a method for operating such a feed supply unit, to a use of such a feed supply unit, to a method for improving the safety profile of the feeding of a viscosity unstable liquid feed to a reactor using such a feed supply unit, and to a method for preventing the solidification of a viscosity unstable liquid feed by using such a feed supply unit.

For example for the production of isocyanates such as diisocyanates, including, but not being restricted to, toluene diisocyanates which in turn may comprise one or more of 2,4-toluene diisocyanate and 2,6-toluene diisocyanate, it is known to supply, in the course of the overall process, a feed comprising nitroaromatic compounds to a reactor. For this supply, a feed dosage unit having a dosage device, a feed pump upstream of the dosage device and a feed pipe connecting the feed pump and the feed dosage device, is commonly used.

Nitroaromatic compounds are often viscosity unstable and tend to solidification such that one or more plugs can establish in the feed dosage unit, especially in its feed pipe. Such a nitroaromatic plug can be a safety-related risk due to the possibility of an uncontrolled runaway reaction. Accumulation of nitroaromatics can lead to uncontrolled runaway reactions at higher temperatures.

For example in WO 2012/123469 A1, it is suggested to unplug a feed dosage unit with hot water in case of predicted or unpredicted stop of the dosage, especially in a case of an unpredicted stop like, for instance, an overfilling of the reactor.

It was therefore an object of the invention to provide improvements relating the safety of a feed supply unit and thus of a chemical production unit comprising such a feed supply unit.

According to the present invention, means are provided that allow an automatic flushing of the feed supply unit. This reduces the risk of a human error and enhances the safety of the feed supply unit and a chemical production unit comprising such a feed supply unit.

Therefore, the present invention relates to a feed supply unit comprising (a) a feed dosage unit for supplying a viscosity unstable liquid feed to a reactor, and (b) a flushing unit for flushing at least a part of the feed dosage unit according to (a) with a flushing medium, wherein the feed dosage unit according to (a) comprises (a.i) a feed dosage device for dosing the feed into a chemical reactor;

(a.ii) a feed pump located upstream of the feed dosage device according (a.i);

(a.iii) a feed pipe connecting the feed pump according to (a.ii) and the feed dosage device according to (a.i);

(a.iv) a feed supply pipe, located upstream of the feed pump according to (a.ii) and ending in the feed pump according to (a.ii);

(a.v) monitoring means for monitoring at least one operating parameter of the feed dosage unit;

wherein the flushing unit according to (b) comprises (b.i) a flushing medium tank and means for pressurizing the flushing medium tank;

(b.ii) a flushing medium pipe comprising a controllable flow-through device for adjusting the flow rate of the flushing medium from the flushing medium tank according to (b.i) to the feed dosage unit according to (a) and connecting the flushing medium tank and at least one of the feed dosage device according to (a.i), the feed pump according to (a.ii), the feed pipe according to (a.iii), and the feed supply pipe according to (a.iv);

(b.iii) control means for controlling the controllable flow-through device according to (b.ii) based on the at least one parameter monitored by the monitoring means according to (a.v);

wherein the feed supply unit further comprises (c) a signal transmission means for transmitting a signal from the monitoring means according to (a.v) to the control means according to (b.iii).

The control means according to (b.iii) for controlling the controllable flow-through device according to (b.ii) can automatically set the flow-through device according to (b.ii) from a throttled or closes state to a less throttled or open state if a parameter of the feed dosage unit according to (a) monitored by the monitoring means according to (a.v) changes in a way that could result from or that could result in a solidification of liquid in the feed dosage unit according to (a). So, a flushing process can be started automatically, especially in a relative early state of the solidification process before it comes to a complete blocking of the feed dosage unit, or before such a solidification process even starts. This of course enhances the operational safety of the feed supply unit significantly.

Preferably, the controllable flow-through device according to (b.ii) comprises one or more of a shutter and a valve, preferably a shutter and a valve, wherein the valve more preferably is an automatic valve. This set-up is particularly preferred since it allows for a pulsed flushing such that possible debris may be removed more easily.

The gain in safety results from an automated monitoring and an automated initiating of flushing processes deduced from said monitoring. So, it is of importance to make sure that an automatically initiated and thus possibly not human-controlled flushing process leads to a successful removal of solidified feed, because otherwise the benefit of the automated process would be lost at least to a high degree. In order to make sure that a flushing process started by the control means according to (b.iii) removes a plug of solidified feed completely or at least to a sufficient extend, it must thus be made sure that the amount of flushing medium, and/or the pressure of the flushing medium is sufficient at each flushing process. This is achieved by providing a flushing medium tank and means for pressurizing it. By means of these features it can be ensured that at the beginning of each flushing process, a sufficiently large amount of flushing medium at a sufficiently high pressure is available for removing solidified feed, such that an initiated flushing process leads to a safe removal of a possibly present plug. It is preferred that the flushing process according to the present invention is integrated in a step chain of the overall process.

Preferably, the feed supply pipe according to (a.iv) comprises a valve, preferably a closing valve, such that the feeding process can be stopped. Because it can be preferred to start a flushing process every time the feeding process is stopped, it can be preferred that the monitoring means according to (a.v) comprise means for monitoring the status of the valve.

Usually, the feed pump according to (a.ii) comprises an electric motor. The status of the motor can give hints regarding the status of the feed supply unit, so it can be preferred that the monitoring means according to (a.v) comprise means for monitoring at least one parameter of the electric motor. Maybe the most straight-forward parameter of the electric motor to be monitored by the monitoring means according to (a.v) is its on/off status. Of course, when the motor turns from on to off, the feeding process is stopped, and this can lead to a start of a flushing process. More subtle parameters can be an electric power consumption, a current flowing through the electric motor, a phase shift between current and voltage, and a temperature of at least one part of the electric motor, since those parameters, alone or in combination, can give hints to a change in the mechanical work the electrical motor has to perform and thus to a status of the feed supply unit. For example, if a solidification of the liquid feed in the feed pipe starts during a feeding process, the flow resistance in the feed pipe will increase, which in turn will lead to an increase of the mechanical work provided by the pump and thus by the electric motor.

Alternatively or additionally, it can preferred that the monitoring means according to (a.v) comprise means for monitoring the amount of viscosity unstable liquid flowing through the feed pipe according to (a.iii). Then the viscosity unstable liquid starts to solidify, the amount of viscosity unstable liquid per time unit—the flow—will usually decrease. So, by monitoring the flow, a starting solidification can be detected and thus a flushing process can be started.

Additionally, it can be preferred that the monitoring means according to (a.v) comprise means for monitoring the temperature of at least one part of the feed supply pipe according to (a.iv).

An easy, reliable, low-maintenance and cost effective way of providing the needed pressure in the flushing medium tank according to (b.i) comprises a pressurized gas inlet being comprised in, preferably constituting the means for pressurizing the flushing medium tank. In most chemical plants, a pressurized gas net, for example a pressurized nitrogen net, is present. This can be used for pressurizing the flushing medium tank according to (b.i). Additionally or alternatively a pump or a compressor can be used.

Preferably, the flushing medium tank according to (b.i) comprises an inlet for the flushing medium. Often, the result of the flushing process will be improved if the temperature of the flushing medium is higher than the normal ambient temperature. So, it can be preferred that the flushing medium tank according to (b.i) further comprises means for adjusting the temperature of the flushing medium contained in the flushing medium tank. The means usually comprise a heating device. These means for adjusting the temperature can be controlled by the control means according to (b.iii).

In at least some applications it will be preferred to conduct flushing processes in regular intervals, even if the parameters monitored by the monitoring means do not indicate a necessity for conducting a flushing process. So, it can be preferred that the control means according to (b.iii) comprises an internal clock. Such a clock can alternatively or additionally be used to control the duration of a flushing process.

Usually, the feed supply unit will be a part of a chemical production plant. A modern chemical production plant usually has monitoring means other than the monitoring means according to (a.v). At least in some configurations it can be useful that the control means according to (b.iii) additionally use information originating from those control means and/or from a central control means of the plant other than the control means according to (b.iii). So, it can be preferred that the control means according to (b.iii) comprises an input interface for receiving signals other than the signals according to (c). Just to give a simple example: If the plant or a part of the same is shut down for major maintenance work or because of an accident, the monitoring means according to (a.v) might not monitor any unusual conditions, but still a flushing process could be necessary due to an interruption of the production.

In turn, the data collected by the control means according to (b.iii) can be additionally used for purposes other than controlling the controllable flow-through device according to (b.ii). For this reason, the control means according to (b.iii) can comprise an output interface for outputting signals originating or being deduced from the monitoring means according to (a.v). The output signals can for example be used for controlling the flow of the viscosity unstable liquid feed through the feed dosage unit according to (a).

As has been mentioned, a known problem with viscosity unstable liquid feeds is that they can have the tendency to solidify. So, in a main application of the invention, the liquid feed is a solidifiable liquid feed, preferably a solidifiable liquid feed comprising one or more organic compounds, more preferably one or more aromatic compounds, more preferably one or more nitroaromatic compounds.

Especially, the solidifiable liquid feed can comprise a dinitrotoluene, preferably 2,4-dinitrotoluene, wherein more preferably, from 65 to 90 weight-%, more preferably from 70 to 85 weight-%, more preferably from 75 to 80 weight-% of the solidifiable liquid feed consist of 2,4-dinitrotoluene.

Even more preferably from 15 to 30 weight-%, more preferably from 20 to 25 weight-% of the solidifiable liquid feed consist of one or more of the group consisting of 2,6-dinitrotoluene, 3,4-dinitrotoluene, 2,3-dinitrotoluene, 2,5-dinitrotoluene, 3,5-dinitrotoluene and at least one mononitrotoluene, wherein more preferably, from 98 to 100 weight-%, more preferably from 99 to 100 weight-%, more preferably from 99.5 to 100 weight-% of the solidifiable liquid feed consist of dinitrotoluene and mononitrotoluene.

The flushing process works especially well, if the flushing process does not rely on a solely mechanical removal of a solidified plug, but melts the plug at least partially. Thus, it is preferred that the temperature of the flushing medium is higher than the melting point of the viscosity unstable liquid feed at the pressure inside the feed dosage unit according to (a), wherein the temperature of the flushing medium is preferably from 1 to 40 K, more preferably from 2 to 35 K, more preferably from 3 to 30 K, more preferably from 4 to 25 K, more preferably from 5 to 20 K higher than the melting point of the viscosity unstable liquid feed at the pressure inside the feed dosage unit according to (a).

In many applications, especially in the case of the above discussed viscosity unstable liquid feed containing organic compounds, the temperature of the flushing medium in the flushing medium tank according to (b.i) is at least 20° C., preferably at least 60° C., more preferably in the range of from 60 to 95° C., more preferably in the range of from 65 to 85° C., more preferably in the range of from 70 to 80° C., in order to achieve a melting of solidified viscosity unstable feed.

In many applications, especially in the above discussed cases, the flushing medium preferably comprises water, wherein preferably from 95 to 100 weight-%, more preferably from 98 to 100 weight-%, more preferably from 99 to 100 weight-% of flushing medium consist of water. Or in other words: Often, the flushing medium is water. This has a number of advantages: First of all, water is of course non-toxic and easily available; a de-ionized water net is a standard feature in many chemical plants. Further, water does not react with or solve organic compounds like aromatic compounds that are of special relevance for the feed supply unit according to the invention. Because such compounds do not solve in water, the flushing medium (water) and the viscosity unstable liquid feed being flushed from the feed dosage unit by means of the flushing medium can easily be separated in a subsequent step, if desired.

As described above, the flushing process is not, or at least not only, started in regular time intervals. It can happen that two flushing processes are performed within a short time interval. So it is preferred that the fill level of the flushing medium tank never falls below a minimum level. It is thus preferred that the fill level of the flushing medium tank according to (b.i) is in the range of from 10 to 100%, preferably in the range of from 15 to 100%, more preferably in the range of 20 to 100%.

Preferably, the feed supply unit is usually not "standing alone", it is a part of a chemical production unit which is preferably a production unit for preparing an isocyanate, more preferably for preparing a diisocyanate, more preferably for preparing a toluene diisocyanate, more preferably for preparing one or more of 2,4-toluene diisocyanate and 2,6-toluene diisocyanate.

Commonly, this production unit further comprises a reactor, and at least a part of the feed dosage device according to (a.i) is located inside the reactor.

Therefore, the invention further relates to a chemical production unit comprising a feed supply unit as described above and a reactor, wherein at least a part of the feed dosage device according to (a.i) is located inside the reactor.

It is preferred that in said reactor of the chemical production unit, the nitroaromatic compound such as the preferred dinitrotoluene, more preferably one or more of 2,4-dinitrotoluene and 2,6-dinitrotoluene, is subjected to hydrogenation conditions, preferably catalytic hydrogenation conditions, to obtain the respective aminoaromatic compound, preferably diaminotoluene, more preferably one or more of 2,4-diaminotoluene (TDA) and 2,6-diaminotoluene. By way of example, it is preferred that in said reactor of the chemical production unit, a mixture comprising 2,4-dinitrotoluene and 2,6-dinitrotoluene, is subjected to hydrogenation conditions, wherein the molar ratio of 2,4-dinitrotoluene relative to 2,6-dinitrotoluene is preferably in the range of from 2:1 to 6:1, preferably in the range of from 3:1 to 5:1, more preferably in the range of from 3.5:1 to 4.5:1 such as 4:1. Further in said chemical production unit, this aminoaromatric compound is preferably reacted to the respective isocyanate compound, preferably diisocyanate compound, more preferably one or more of 2,4-toluene diisocyanate (TDI) and 2,6-toluene diisocyanate, such as a mixture of 2,4-toluene diisocyanate (TDI) and 2,6-toluene diisocyanate, wherein this reaction is preferably carried out using phosgene. Further upstream in said chemical production unit, it is preferred that the nitroaromatic compound comprised in the viscosity unstable liquid feed is suitably prepared from the respective aromatic compound, preferably toluene, wherein for this reaction, a suitable nitrating agent, preferably a nitrating acid, preferably comprising nitric acid and sulfuric acid, is employed. Further, it is conceivable that the feed supply unit according to the present invention may also be used in a chemical production unit in which methylene diphenylisocyanate (MDI) is obtained as valuable product.

Usually, the volume of liquid flushing medium used in a flushing process must be substantially smaller than the volume of the reactor, such that the reactor is not over-filled due to a flushing process. So, the volume of the flushing medium tank according to (b.i) can also be substantially smaller than the volume of the reactor. In order to save space and material, it is not desired to dimension the flushing medium tank larger than necessary. So, the volume of the flushing medium tank is preferably in the range of from 1 to 500%, more preferably in the range of from 1 to 250%, more preferably in the range of 1 to 50%, preferably from 1.5 to 20%, more preferably from 2 to 10%, more preferably from 2.5 to 5% of the volume of the reactor.

According to current knowledge, the preferred volume of the flushing medium tank according to (b.i) is in the range of from 3 to 4% of the volume of the reactor.

Generally, the pressure inside the flushing medium tank according to (b.i) should be higher than the pressure inside the reactor in order to enable the flushing medium to flow through the feed dosage device according to (a.i) into the reactor, but the pressure difference between the flushing medium tank and the reactor should not be too high, such that an overpressure inside the reactor is avoided. As a consequence, the pressure inside the flushing medium tank according to (b.i) is preferably in the range of from 101 to 500%, more preferably in the range of from 101 to 350%, more preferably in the range of from 101 to 200%, more preferably in the range of from 101.5 to 150%, more preferably in the range of from 102 to 120%, more preferably in the range of from 102.5 to 110% of the pressure inside the reactor. Often, it is preferred that the pressure is at most 64 bar(abs), more preferably at most 63 bar(abs).

According to current knowledge, the preferred pressure inside the flushing medium tank according to (b.i) is in the range of from 103 to 105% of the pressure inside the reactor.

Usually, the feed supply unit and the chemical production unit can only work successfully when it is operated according to the inventive concept.

Therefore, the present invention also relates to a method for operating the feed supply unit or the chemical production unit described above, wherein the method comprises (i) providing a viscosity unstable liquid feed;

(ii) feeding the liquid feed according to (i) via the feed supply pipe according to (a.iv) through the feed pump according to (a.ii) to the feed dosage device according to (a.1) via the feed pipe according to (a.iii);

(iii) monitoring the at least one operation parameter of the feed dosage unit according to (a) via the monitoring means according to (a.v) and transmitting a signal from the monitoring means according to (a.v) to the control means according to (b.iii) via the signal transmission means according to (c);

(iv) starting a flushing process if at least one of the at least one operating parameter of the feed dosage unit according to (a) changes beyond a pre-defined threshold value, wherein said flushing process comprising flushing, for a period of time, at least one of the feed dosage device according to (a.i), the feed pump according to (a.ii), the feed pipe according to (a.iii), the feed supply pipe according to (a.iv)

with a flushing medium contained in the pressurized flushing medium tank according to (b.i) via the flushing medium pipe according to (b.ii) by increasing the flow of the flushing medium through the flow-through device according to (b.ii).

The main purpose of conducting a flushing process according to (iv) is to remove a plug of solidified feed or to hinder the liquid feed from starting to solidify. So, it would often be counterproductive to continue with the feeding of the liquid feed during a flushing process. Consequently, the method preferably further comprises reducing feeding the liquid feed to the feed dosage device according to (ii), preferably stopping feeding the liquid feed to the feed dosage device according to (ii), wherein said reducing feeding, preferably said stopping feeding, is carried out simultaneously with or after flushing according to (iv).

As long as the feed supply unit operates normally, there is usually no need to introduce flushing medium into the feed dosage unit. So, the controllable flow-through device is preferably closed when no flushing process according to (iv) is carried out.

Preferably, it is the aim of a flushing process to remove a plug of solidified feed completely. It has been found out that carrying out the flushing process according to (iv) for at least 5 s, preferably for at least 10 s, more preferably at least 20 s is usually necessary to reach this goal, wherein it is preferred that the duration of the flushing process according to (iv) is in the range of from 5 s to 30 min, preferably in the range of from 10 s to 15 min, more preferably in the range of from 20 s to 5 min.

But not only the duration of the flushing process, also the velocity at which the flushing medium is flushed through the feed pipe, is a relevant parameter. It has been found out that in most cases this velocity should be at least the velocity of directional flow, more preferably at least 0.05 m/s, preferably of at least 0.1 m/s, more preferably of at least 0.3 m/s.

As has already been mentioned, the method according to the invention is especially useful for operating a feed supply unit that feeds a solidifiable liquid feed, preferably a solidifiable liquid feed comprising one or more organic compounds, more preferably one or more aromatic compounds, more preferably one or more nitroaromatic compounds.

In especially preferred application cases, the solidifiable liquid feed comprises a dinitrotoluene, preferably 2,4-dinitrotoluene, wherein more preferably, from 65 to 90 weight-%, more preferably from 70 to 85 weight-%, more preferably from 75 to 80 weight-% of the solidifiable liquid feed consist of 2,4-dinitrotoluene, especially from 10 to 35 weight-%, preferably from 15 to 30 weight %, more preferably from 20 to 25 weight-% of the solidifiable liquid feed consist of one or more of the group consisting of 2,6-dinitrotoluene, 3,4-dinitrotoluene, 2,3-dinitrotoluene, 2,5-dinitrotoluene, 3,5-dinitrotoluene and at least one mononitrotoluene, wherein more preferably, from 98 to 100 weight-%, more preferably from 99 to 100 weight-%, more preferably from 99.5 to 100 weight % of the solidifiable liquid feed consist of dinitrotoluene and mononitrotoluene.

As has already been mentioned, at least during the flushing process according to (iv), the temperature of the flushing medium in the flushing medium tank according to (b.i) is preferably higher than the melting point of the viscosity unstable liquid feed at the pressure inside the feed dosage unit according to (a), wherein at least during the flushing process according to (iv), the temperature of the flushing medium is preferably from 1 to 40 K, more preferably from 2 to 35 K, more preferably from 3 to 30 K, more preferably from 4 to 25 K, more preferably from 5 to 20 K higher than the melting point of the viscosity unstable liquid feed at the pressure inside the feed dosage unit according to (a), such that a plug of solidified feed is not only mechanically removed, but also at least partially melted such that it is again in liquid form.

In order to be able to at least partially melt a plug of solidified feed, the temperature of the flushing medium in the flushing medium tank according to (b.i) is at least 20° C., preferably at least 60° C., more preferably in the range of from 60 to 95° C., more preferably in the range of from 65 to 85° C., more preferably in the range of from 70 to 80° C.

As has also been mentioned, the flushing medium preferably comprises water, wherein preferably from 95 to 100 weight-%, more preferably from 98 to 100 weight-%, more preferably from 99 to 100 weight-% of flushing medium consist of water.

An important aspect of the inventive method is that the flushing process can be started automatically depending on parameters monitored by the monitoring means according to (a.v). So, it can happen that a flushing process is started within a short period of time after a preceding flushing process has ended. Of course, the flushing medium tank according to (b.i) should even in this case enclose sufficient flushing medium, such that the new flushing process can be completed. For this reason, the fill level of the flushing medium tank according to (b.i), preferably prior to the flushing process according to (iv), is preferably in the range of from 10 to 100%, preferably in the range of from 15 to 100%, more preferably in the range of 20 to 100%.

It has been found out that the method is especially successful when during the flushing process according to (iv), a volume of at least 30 l, preferably of at least 50 l, more preferably of at least 70 l of the flushing medium from the flushing medium tank according to (b.i) is used for the flushing process.

In this context, it is preferred that the flushing process according to (iv) is repeated once, preferably 2 to 9 times, such that the flushing process is performed in total at least once, preferably twice, and more preferably 3 to 10 times. It is particularly preferred that at least one of the feed pipe according to (a.iii) and the feed supply pipe according to (a.iv) is flushed, preferably repeatedly as defined herein.

According to a first alternative, it is preferred that the flushing process according to (iv) comprises flushing of the feed pipe according to (a.iii), wherein the volume of the flushing medium used for the flushing process is preferably equal to or greater than the volume of the feed pipe according to (a.iii).

According to a second alternative, it is preferred that the flushing process according to (iv) comprises flushing of the feed supply pipe according to (a.iv), wherein the volume of the flushing medium used for the flushing process is preferably equal to or greater than the volume of the feed supply pipe according to (a.iv).

According to a third alternative, it is preferred that the flushing process according to (iv) comprises flushing of the feed pipe according to (a.iii) and the feed supply pipe according to (a.iv), wherein the volume of the flushing medium used for the flushing process is preferably equal to or greater than the volume of the feed pipe according to (a.iii) and the feed supply pipe according to (a.iv).

Usually, the volume of flushing medium from the flushing medium tank according to (b.i) used for the flushing process is much smaller than the volume of the reactor. In praxis, it is preferably in the range of from 0.1 to 1%, more preferably in the range of from 0.15 to 0.75%, and more preferably in the range of from 0.3% to 0.5% of the reaction volume of the reactor. So, there is no risk of an overfilling of the reactor during a flushing process. It may be preferred that the volume of flushing medium from the flushing medium tank according to (b.i) used for the flushing process is in the range of from 0.1 to 5%, more preferably in the range of from 0.15 to 3%, and more preferably in the range of from 0.3% to 2% of the reaction volume of the reactor.

In addition to the flushing processes started because of a change of a parameter monitored by the monitoring means according to (a.v), the method can comprise starting the flushing process according to (iv) in pre-defined time intervals, such that a flushing process is performed even if no parameter indicates a solidification of the liquid feed. By performing such regular flushing processes, even a beginning solidification can be suppressed at least in some cases. Two given flushing processes may differ in at least one process parameter.

As has been described above, the control means according to (b.iii) can comprise an input interface for receiving signals other than signals according to (c) (external signals). In order to make use of such external signals, the method can comprise starting the flushing process according to (iv) based on an external signal other than a signal according to (c).

The risk that initially liquid feed has solidified to a plug is relatively high during production stop when no liquid feed is supplied by the feed dosage unit. Consequently, it can be preferred that the method according to the invention comprises an initial flushing process which is started before a feeding process according to (ii) is started if the feed pump according to (a.ii) has been at rest for longer than a pre-defined period of time, said initial flushing process comprising flushing, for a period of time, at least one of
the feed dosage device according to (a.i),
the feed pump according to (a.ii),
the feed pipe according to (a.iii), and
the feed supply pipe according to (a.iv).

Preferably, the feed pipe according to (a.iii) and/or the feed supply pipe according to (a.iv) is heated during one or more of (i), (ii), (iii), and (iv), preferably during (i), (ii), (iii), and (iv), to a temperature higher than the melting point of the viscosity unstable liquid feed at the pressure inside the feed dosage unit according to (a) and lower than the decomposition temperature of the viscosity unstable liquid feed at the pressure inside the feed dosage unit according to (a), wherein the feed pipe according to (a.iii) and/or the feed supply pipe according to (a.iv) is preferably heated during one or more of (i), (ii), (iii), and (iv), preferably during (i), (ii), (iii), and (iv), to a temperature in the range of from 60 to 100° C.

The present invention is further illustrated by the following set of embodiments and combinations of embodiments resulting from the dependencies and back-references as indicated. In particular, it is noted that in each instance where a range of embodiments is mentioned, for example in the context of a term such as "the feed supply unit of any one of embodiments 1 to 4", every embodiment in this range is meant to be explicitly disclosed for the skilled person, i.e. the wording of this term is to be understood by the skilled person as being synonymous to "the feed supply unit of any one of embodiments 1, 2, 3, and 4". Further, it is explicitly noted that the following set of embodiments represents a suitably structured part of the general description directed to preferred aspects of the present invention, and, thus, suitably supports, but does not represent the claims of the present invention.

1. A feed supply unit comprising
    (a) a feed dosage unit for supplying a viscosity unstable liquid feed to a reactor, and
    (b) a flushing unit for flushing at least a part of the feed dosage unit according to (a) with a flushing medium,
    wherein the feed dosage unit according to (a) comprises
    (a.i) a feed dosage device for dosing the feed into a chemical reactor;
    (a.ii) a feed pump located upstream of the feed dosage device according (a.i);
    (a.iii) a feed pipe connecting the feed pump according to (a.ii) and the feed dosage device according to (a.i);
    (a.iv) a feed supply pipe, located upstream of the feed pump according to (a.ii) and ending in the feed pump according to (a.ii);
    (a.v) monitoring means for monitoring at least one operating parameter of the feed dosage unit;
    wherein the flushing unit according to (b) comprises
    (b.i) a flushing medium tank and means for pressurizing the flushing medium tank;
    (b.ii) a flushing medium pipe comprising a controllable flow-through device for adjusting the flow rate of the flushing medium from the flushing medium tank according to (b.i) to the feed dosage unit according to (a) and connecting the flushing medium tank and at least one of
    the feed dosage device according to (a.i),
    the feed pump according to (a.ii),
    the feed pipe according to (a.iii), and
    the feed supply pipe according to (a.iv);
    (b.iii) control means for controlling the controllable flow-through device according to (b.ii) based on the at least one parameter monitored by the monitoring means according to
    (a.v);
    wherein the feed supply unit further comprises
    (c) signal transmission means for transmitting a signal from the monitoring means according to (a.v) to the control means according to (b.iii).
2. The feed supply unit of embodiment 1, wherein the feed supply pipe according to (a.iv) comprises a valve, preferably a closing valve.
3. The feed supply unit of embodiment 2, wherein the monitoring means according to (a.v) comprise means for monitoring the status of the valve.
4. The feed supply unit of any one of the embodiments 1 to 3, wherein the feed pump according to (a.ii) comprises an electric motor.
5. The feed supply unit of embodiment 4, wherein the monitoring means according to (a.v) comprise means for monitoring at least one parameter of the electric motor.
6. The feed supply unit of embodiment 5, wherein the parameter of the electric motor monitored by the monitoring means according to (a.v) is one of an on/off-status, an electric power consumption, a current flowing through the electric motor, a phase shift between current and voltage, and a temperature of at least one part of the electric motor.
7. The feed supply unit of any one of embodiments 1 to 6, wherein the monitoring means according to (a.v) comprise means for monitoring the amount of viscosity unstable liquid flowing through the feed pipe according to (a.iii).

8. The feed supply unit of any one of embodiments 1 to 7, wherein the monitoring means according to (a.v) comprise means for monitoring the temperature of at least one part of the feed supply pipe according to (a.iv).

9. The feed supply unit of any one of embodiments 1 to 8, wherein the flushing medium tank according to (b.i) comprises a pressurized gas inlet being comprised in, preferably constituting the means for pressurizing the flushing medium tank.

10. The feed supply unit of any one of embodiments 1 to 9, wherein the flushing medium tank according to (b.i) comprises an inlet for the flushing medium.

11. The feed supply unit of any one of embodiments 1 to 10, wherein the flushing medium tank according to (b.i) further comprises means for adjusting the temperature of the flushing medium contained in the flushing medium tank.

12. The feed supply unit of embodiment 11, wherein the means for adjusting the temperature are controlled by the control means according to (b.iii).

13. The feed supply unit of any one of embodiments 1 to 12, wherein the control means according to (b.iii) comprises an internal clock.

14. The feed supply unit of any one of embodiments 1 to 13, wherein the control means according to (b.iii) comprises an input interface for receiving signals other than the signals according to (c).

15. The feed supply unit of any one of embodiments 1 to 14, wherein the control means according to (b.iii) comprises an output interface for outputting signals controlling the flow of the viscosity unstable liquid feed through the feed dosage unit according to (a).

16. The feed supply unit of any one of embodiments 1 to 15, wherein the viscosity unstable liquid feed is a solidifiable liquid feed, preferably a solidifiable liquid feed comprising one or more organic compounds, more preferably one or more aromatic compounds, more preferably one or more nitroaromatic compounds.

17. The feed supply unit of embodiment 16, wherein the solidifiable liquid feed comprises a dinitrotoluene, preferably 2,4-dinitrotoluene, wherein more preferably, from 65 to 90 weight %, more preferably from 70 to 85 weight-%, more preferably from 75 to 80 weight-% of the solidifiable liquid feed consist of 2,4-dinitrotoluene.

18. The feed supply unit of embodiment 17, wherein from 10 to 35 weight-%, preferably from 15 to 30 weight-%, more preferably from 20 to 25 weight-% of the solidifiable liquid feed consist of one or more of the group consisting of 2,6-dinitrotoluene, 3,4-dinitrotoluene, 2,3-dinitrotoluene, 2,5-dinitrotoluene, 3,5-dinitrotoluene and at least one mononitrotoluene, wherein more preferably, from 98 to 100 weight-%, more preferably from 99 to 100 weight %, more preferably from 99.5 to 100 weight-% of the solidifiable liquid feed consist of dinitrotoluene and mononitrotoluene.

19. The feed supply unit of anyone of embodiments 1 to 18, wherein the temperature of the flushing medium is higher than the melting point of the viscosity unstable liquid feed at the pressure inside the feed dosage unit according to (a), wherein the temperature of the flushing medium is preferably from 1 to 40 K, more preferably from 2 to 35 K, more preferably from 3 to 30 K, more preferably from 4 to 25 K, more preferably from 5 to 20 K higher than the melting point of the viscosity unstable liquid feed at the pressure inside the feed dosage unit according to (a).

20. The feed supply unit of embodiment 18 or 19, preferably insofar as embodiment 20 depends on embodiment 17, wherein the temperature of the flushing medium in the flushing medium tank according to (b.i) is at least 20° C., preferably at least 60° C., more preferably in the range of from 60 to 95° C., more preferably in the range of from 65 to 85° C., more preferably in the range of from 70 to 80° C.

21. The feed supply unit of any one of embodiments 1 to 20, wherein the flushing medium comprises water, wherein preferably from 95 to 100 weight-%, more preferably from 98 to 100 weight-%, more preferably from 99 to 100 weight-% of flushing medium consist of water.

22. The feed supply unit of any one of embodiments 1 to 21, wherein the fill level of the flushing medium tank according to (b.i) is in the range of from 10 to 100%, preferably in the range of from 15 to 100%, more preferably in the range of 20 to 100%.

23. The feed supply unit of any one of embodiments 1 to 22, wherein the controllable flowthrough device according to (b.ii) comprises one or more of a shutter and a valve, preferably a shutter and a valve, wherein the valve more preferably is an automatic valve.

24. The feed supply unit of any one of embodiments 1 to 23, being comprised in a chemical production unit, the production unit further comprising a reactor, wherein at least a part of the feed dosage device according to (a.i) is located inside the reactor.

25. The feed supply unit of embodiment 24, wherein the volume of the flushing medium tank according to (b.i) is in the range of from 1 to 50%, preferably from 1.5 to 20%, more preferably from 2 to 10%, more preferably from 2.5 to 5% of the volume of the reactor.

26. The feed supply unit of embodiment 25, wherein the volume of the flushing medium tank according to (b.i) is in the range of from 3 to 4% of the volume of the reactor.

27. The feed supply unit of any one of embodiments 24 to 26, wherein the pressure inside the flushing medium tank according to (b.i) is higher than the pressure inside the reactor, wherein more preferably, the pressure inside the flushing medium tank according to (b.i) is in the range of from 101 to 200%, more preferably in the range of from 101.5 to 150%, more preferably in the range of from 102 to 120%, more preferably in the range of from 102.5 to 110% of the pressure inside the reactor.

28. The feed supply unit of embodiment 27, wherein the pressure inside the flushing medium tank according to (b.i) is in the range of from 103 to 105% of the pressure inside the reactor.

29. A chemical production unit, preferably for preparing an isocyanate, more preferably for preparing a diisocyanate, more preferably for preparing a toluene diisocyanate, more preferably for preparing one or more of 2,4-toluene diisocyanate and 2,6-toluene diisocyanate, said chemical production unit comprising a feed supply unit according to any one of embodiments 1 to 23, preferably according to any one of embodiments 1 to 21, and a reactor, wherein at least a part of the feed dosage device according to (a.i) is located inside the reactor.

30. The chemical production unit of embodiment 29, wherein the volume of the flushing medium tank according to (b.i) is in the range of from 1 to 50%, preferably from 1.5 to 20%, more preferably from 2 to 10%, more preferably from 2.5 to 5% of the volume of the reactor.

31. The chemical production unit of embodiment 30, wherein the volume of the flushing medium tank according to (b.i) is in the range of from 3 to 4% of the volume of the reactor.

32. The chemical production unit of any one of embodiments 29 to 31, wherein the pressure inside the flushing medium tank according to (b.i) is higher than the pressure inside the reactor, wherein more preferably, the pressure inside the flushing medium tank according to (b.i) is in the range of from 101 to 150%, more preferably in the range of from 101.5 to 135%, more preferably in the range of from 102 to 120%, more preferably in the range of from 102.5 to 110% of the pressure inside the reactor.

33. The chemical production unit of embodiment 32, wherein the pressure inside the flushing medium tank according to (b.i) is in the range of from 103 to 105% of the pressure inside the reactor.

34. A method for operating the feed supply unit according to any one of embodiments 1 to 28 or the chemical production unit according to any one of embodiments 29 to 33, the method comprising
(i) providing a viscosity unstable liquid feed;
(ii) feeding the liquid feed according to (i) via the feed supply pipe according to (a.iv) through the feed pump according to (a.ii) to the feed dosage device according to (a.1) via the feed pipe according to (a.iii);
(iii) monitoring the at least one operation parameter of the feed dosage unit according to (a) via the monitoring means according to (a.v) and transmitting a signal from the monitoring means according to (a.v) to the control means according to (b.iii) via the signal transmission means according to (c);
(iv) starting a flushing process if at least one of the at least one operating parameter of the feed dosage unit according to (a) changes beyond a pre-defined threshold value, wherein said flushing process comprising flushing, for a period of time, at least one of
the feed dosage device according to (a.i),
the feed pump according to (a.ii),
the feed pipe according to (a.iii),
the feed supply pipe according to (a.iv)
with a flushing medium contained in the pressurized flushing medium tank according to (b.i) via the flushing medium pipe according to (b.ii) by increasing the flow of the flushing medium through the flow-through device according to (b.ii).

35. The method of embodiment 34, wherein the flushing process according to (iv) further comprises reducing feeding the liquid feed to the feed dosage device according to (ii), preferably stopping feeding the liquid feed to the feed dosage device according to (ii), wherein said reducing feeding, preferably said stopping feeding, is carried out simultaneously with or after flushing according to (iv).

36. The method of embodiment 34 or 35, wherein the controllable flow-through device is closed when no flushing process according to (iv) is carried out.

37. The method of any one of embodiments 34 to 36, wherein the flushing process according to (iv) is carried out for at least 5 s, preferably for at least 10 s, more preferably for at least 20 s.

38. The method of any one of embodiments 34 to 37, wherein the duration of the flushing process according to (iv) is in the range of from 5 s to 30 min, preferably in the range of from 10 s to 15 min, more preferably in the range of from 20 s to 5 min.

39. The method of any one of embodiments 34 to 38, wherein during the flushing process according to (iv), flushing medium is flushed through the feed pipe according to (a.iii) at a velocity of at least 0.05 m/s, preferably of at least 0.1 m/s, more preferably of at least 0.3 m/s.

40. The method of any one of embodiments 34 to 39, wherein the viscosity unstable liquid feed is a solidifiable liquid feed, preferably a solidifiable liquid feed comprising one or more organic compounds, more preferably one or more aromatic compounds, more preferably one or more nitroaromatic compounds.

41. The method of embodiment 40, wherein the solidifiable liquid feed comprises a dinitrotoluene, preferably 2,4-dinitrotoluene, wherein more preferably, from 65 to 90 weight-%, more preferably from 70 to 85 weight-%, more preferably from 75 to 80 weight-% of the solidifiable liquid feed consist of 2,4-dinitrotoluene.

42. The method of embodiment 41, wherein from 10 to 35 weight-%, preferably from 15 to 30 weight-%, more preferably from 20 to 25 weight-% of the solidifiable liquid feed consist of one or more of the group consisting of 2,6-dinitrotoluene, 3,4-dinitrotoluene, 2,3-dinitrotoluene, 2,5-dinitrotoluene, 3,5-dinitrotoluene and at least one mononitrotoluene, wherein more preferably, from 98 to 100 weight-%, more preferably from 99 to 100 weight-%, more preferably from 99.5 to 100 weight-% of the solidifiable liquid feed consist of dinitrotoluene and mononitrotoluene.

43. The method of anyone of embodiments 34 to 42, wherein at least during the flushing process according to (iv), the temperature of the flushing medium in the flushing medium tank according to (b.i) is higher than the melting point of the viscosity unstable liquid feed at the pressure inside the feed dosage unit according to (a), wherein at least during the flushing process according to (iv), the temperature of the flushing medium is preferably from 1 to 40 K, more preferably from 2 to 35 K, more preferably from 3 to 30 K, more preferably from 4 to 25 K, more preferably from 5 to 20 K higher than the melting point of the viscosity unstable liquid feed at the pressure inside the feed dosage unit according to (a).

44. The method of embodiment 42 or 43, preferably insofar as embodiment 43 depends on embodiment 40, wherein the temperature of the flushing medium in the flushing medium tank according to (b.i) is at least 20° C., preferably at least 60° C., more preferably in the range of from 60 to 95° C., more preferably in the range of from 65 to 85° C., more preferably in the range of from 70 to 80° C.

45. The method of any one of embodiments 34 to 44, wherein the flushing medium comprises water, wherein preferably from 95 to 100 weight-%, more preferably from 98 to 100 weight %, more preferably from 99 to 100 weight-% of flushing medium consist of water.

46. The method of any one of embodiments 34 to 45, wherein the fill level of the flushing medium tank according to (b.i), preferably prior to the flushing process according to (iv), is in the range of from 10 to 100%, preferably in the range of from 15 to 100%, more preferably in the range of 20 to 100%.

47. The method of any one of embodiments 34 to 46, wherein during the flushing process according to (iv), a volume of at least 30 l, preferably of at least 50 l, more preferably of at least 70 l of the flushing medium from the flushing medium tank according to (b.i) is used for the flushing process.

48. The method of any one of embodiments 34 to 47, wherein the flushing process according to (iv) is repeated once, preferably 2 to 9 times.

49. The method of any one of embodiments 34 to 48, preferably of embodiment 48, wherein the flushing process according to (iv) comprises flushing of the feed pipe according to (a.iii), wherein the volume of the flushing medium used for the flushing process is preferably equal to or greater than the volume of the feed pipe according to (a.iii).

50. The method of any one of embodiments 34 to 48, preferably of embodiment 48, wherein the flushing process according to (iv) comprises flushing of the feed supply pipe according to (a.iv), wherein the volume of the flushing medium used for the flushing process is preferably equal to or greater than the volume of the feed supply pipe according to (a.iv).

51. The method of any one of embodiments 34 to 48, preferably of embodiment 48, wherein the flushing process according to (iv) comprises flushing of the feed pipe according to (a.iii) and the feed supply pipe according to (a.iv), wherein the volume of the flushing medium used for the flushing process is preferably equal to or greater than the volume of the feed pipe according to (a.iii) and the feed supply pipe according to (a.iv).

52. The method of any one of embodiments 34 to 51, the feed supply unit being comprised in a chemical production unit, the chemical production unit further comprising a reactor, wherein at least a part of the feed dosage device according to (a.i) is located inside the reactor, wherein during the flushing process according to (iv), the volume of flushing medium from the flushing medium tank according to (b.i) used for the flushing process is in the range of from 0.1 to 1%, preferably in the range of from 0.15 to 0.75%, more preferably in the range of from 0.3% to 0.5% of the reaction volume of the reactor, wherein said chemical production unit is preferably a production unit for preparing an isocyanate, more preferably for preparing a diisocyanate, more preferably for preparing a toluene diisocyanate, more preferably for preparing one or more of 2,4-toluene diisocyanate and 2,6-toluene diisocyanate.

53. The method of any one of embodiments 34 to 52, comprising starting the flushing process according to (iv) in pre-defined time intervals, wherein two given flushing processes may differ in at least one process parameter.

54. The method of any one of embodiments 34 to 53, comprising starting the flushing process according to (iv) based on an external signal other than a signal according to (c).

55. The method of any one of embodiments 34 to 54, comprising an initial flushing process which is started before a feeding process according to (ii) is started if the feed pump according to (a.ii) has been at rest for longer than a pre-defined period of time, said initial flushing process comprising flushing, for a period of time, at least one of
   the feed dosage device according to (a.i),
   the feed pump according to (a.ii),
   the feed pipe according to (a.iii), and
   the feed supply pipe according to (a.iv).

56. The method of any one of embodiments 34 to 55, wherein the feed pipe according to (a.iii) and/or the feed supply pipe according to (a.iv) is heated during one or more of (i), (ii), (iii), and (iv), preferably during (i), (ii), (iii), and (iv), to a temperature higher than the melting point of the viscosity unstable liquid feed at the pressure inside the feed dosage unit according to (a) and lower than the decomposition temperature of the viscosity unstable liquid feed at the pressure inside the feed dosage unit according to (a), wherein the feed pipe according to (a.iii) and/or the feed supply pipe according to (a.iv) is preferably heated during one or more of (i), (ii), (iii), and (iv), preferably during (i), (ii), (iii), and (iv), to a temperature in the range of from 60 to 100° C.

57. Use of a feed supply unit according to any one of embodiments 1 to 28 for improving the safety profile of the feeding of a viscosity unstable liquid feed to a reactor.

58. A method for improving the safety profile of the feeding of a viscosity unstable liquid feed to a reactor, the method comprising employing a feed supply unit according to any one of embodiments 1 to 28.

59. Use of a feed supply unit according to any one of embodiments 1 to 28 for preventing the solidification of a viscosity unstable liquid feed being fed to a reactor via said feed supply unit.

60. A method for preventing the solidification of a viscosity unstable liquid feed, the method comprising employing a feed supply unit according to any one of embodiments 1 to 28 for feeding said viscosity unstable liquid feed to a reactor.

BRIEF DESCRIPTION OF THE FIGURE

The invention will now be further described by means of an example embodiment in view of a FIGURE.

FIG. 1: a schematic representation of a chemical production unit according to an example embodiment of the invention.

FIG. 1 shows an example embodiment of a chemical production unit according to the invention.

This chemical production unit is comprised of a reactor 3 and a feed supply unit. The feed supply unit can be looked at as been comprised of a feed dosage unit, a flushing unit and signal lines 24 constituting signal transmission means. As it will be described later, these signal lines 24 connects parts of the feed dosage unit with a part of the flushing unit.

The feed dosage unit serves for supplying a viscosity unstable liquid feed into the reactor 3. This feed dosage unit comprises a feed dosage device 10, which can for example be a nozzle, being placed inside the reactor 3, a feed pump 2, a feed pipe 1 connecting the feed pump 2 with the feed dosage device 10, and a feed supply pipe 8 supplying the feed pump 2 with liquid feed. As can be seen, the feed supply pipe 8 comprises a valve 9 and the feed pipe 1 comprises two valves 1a, 1b. The feed pump 2 usually comprises a mechanical part and an electric motor.

In the example embodiment shown, the feed dosage unit further comprises three monitoring means 20, 21, 22 namely a valve monitoring means 20 monitoring the status of the valve 9 of the feed supply pipe 8, for example its open/close state, a motor of pump monitoring means 21, which in a simple case monitors the on/off state of the motor of the feed pump 2, and a feed pipe monitoring means 22. This feed pipe monitoring means 22 monitors for example the open/close states of the valves 1*a*, 1*b* of the feed pipe 1 and/or the flow through the feed pipe 1.

The flushing unit comprises a flushing medium tank 4 having a pressurized gas inlet 5 and an inlet 6 for flushing medium. The flushing medium is in most cases de-ionized water. The pressure inside the flushing medium tank exceeds the pressure in the reactor 3. The flushing unit further comprises a flushing medium pipe 7 having a valve 9 forming a controllable flow through device.

This flushing medium pipe 7 extends from the flushing medium tank 4—usually its bottom—to the feed dosage unit, especially to its feed pipe 1. In the example embodiment shown, the flushing medium pipe ends between the two valves 1*a*, 1*b* of the feed pipe 1. Although this is not shown in the schematic representation of FIG. 1, the flushing medium tank 4 is usually substantially smaller than the reactor 3. A heating device can be provided inside the flushing medium tank 4 but is not shown in the FIGURE.

A control means 23 controls the controllable flow-through device 11 of the flushing medium pipe. In a simple case the controllable flow-through device 11 only has the states "open" and "closed", such that the control means 23 can only make the controllable flow-through device 11 change between these two states. The control means 23 usually has an internal clock.

The afore-mentioned signal lines 24 transmit signals from the valve monitoring means 20, the motor of pump monitoring means 21, and the feed pipe monitoring means 22 to the control means 23.

Depending on the signals received from the monitoring means 20, 21, 22 the control means 23 opens the controllable flow-through device 11 such that a flushing process is started and flushing medium streams from the flushing medium tank 4 through the flushing medium pipe 7 and at least a section of the feed pipe 1 into the reactor 3. In the example embodiment shown, typical signals generated by be monitoring means that lead to a start of a flushing process are that the valve 9 changes its open/closed state and/or the motor of the feed pump changed its on/off state. The duration of a flushing process can be controlled by the internal clock of the control means 23.

LIST OF REFERENCE NUMBERS IN THE FIGURES

1 feed pipe
1*a,b* valve in feed pipe
2 feed pump
3 reactor
4 flushing medium tank
5 pressurized gas inlet
6 inlet for flushing medium
7 flushing medium pipe
8 feed supply pipe
9 valve of feed supply pipe
10 feed dosage device
11 controllable flow-through device (valve of flushing medium pipe)
20 valve monitoring means
21 motor of pump monitoring means
22 feed pipe monitoring means
23 control means
24 signal lines

18

The invention claimed is:
1. A feed supply unit comprising
(a) a feed dosage unit for supplying a viscosity unstable liquid feed to a reactor, and
(b) a flushing unit for flushing at least a part of the feed dosage unit according to (a) with a flushing medium,
wherein the feed dosage unit according to (a) comprises
(a.i) a feed dosage device for dosing the feed into a chemical reactor;
(a.ii) a feed pump located upstream of the feed dosage device according (a.i);
(a.iii) a feed pipe connecting the feed pump according to (a.ii) and the feed dosage device according to (a.i);
(a.iv) a feed supply pipe, located upstream of the feed pump according to (a.ii) and ending in the feed pump according to (a.ii);
(a.v) monitoring means for monitoring at least one operating parameter of the feed dosage unit;
wherein the flushing unit according to (b) comprises
(b.i) a flushing medium tank and means for pressurizing the flushing medium tank;
(b.ii) a flushing medium pipe comprising a controllable flow-through device for adjusting the flow rate of the flushing medium from the flushing medium tank according to (b.i) to the feed dosage unit according to (a) and connecting the flushing medium tank and at least one of
the feed dosage device according to (a.i),
the feed pump according to (a.ii),
the feed pipe according to (a.iii), and
the feed supply pipe according to (a.iv);
(b.iii) control means for controlling the controllable flow-through device according to (b.ii) based on the at least one parameter monitored by the monitoring means according to (a.v);
wherein the feed supply unit further comprises
(c) signal transmission means for transmitting a signal from the monitoring means according to (a.v) to the control means according to (b.iii).
2. The feed supply unit of claim 1, wherein the feed supply pipe according to (a.iv) comprises a valve and wherein the monitoring means according to (a.v) comprise means for monitoring the status of the valve.
3. The feed supply unit of claim 1, wherein the feed pump according to (a.ii) comprises an electric motor and wherein the monitoring means according to (a.v) comprise means for monitoring at least one parameter of the electric motor.
4. A chemical production unit, said chemical production unit comprising a feed supply unit according to claim 1 and a reactor, wherein at least a part of the feed dosage device according to (a.i) is located inside the reactor.
5. The chemical production unit of claim 4, wherein the volume of the flushing medium tank according to (b.i) is in the range of from 1 to 50% of the volume of the reactor.
6. A method for operating the feed supply unit according to claim 1, the method comprising
(i) providing a viscosity unstable liquid feed;
(ii) feeding the liquid feed according to (i) via the feed supply pipe according to (a.iv) through the feed pump according to (a.ii) to the feed dosage device according to (a.1) via the feed pipe according to (a.iii);
(iii) monitoring the at least one operation parameter of the feed dosage unit according to (a) via the monitoring means according to (a.v) and transmitting a signal from the monitoring means according to (a.v) to the control means according to (b.iii) via the signal transmission means according to (c);
(iv) starting a flushing process if at least one of the at least one operating parameter of the feed dosage unit accord- ing to (a) changes beyond a pre-defined threshold value, wherein said flushing process comprising flushing, for a period of time, at least one of the feed dosage device according to (a.i), the feed pump according to (a.ii), the feed pipe according to (a.iii), the feed supply pipe according to (a.iv)

with a flushing medium contained in the pressurized flushing medium tank according to (b.i) via the flushing medium pipe according to (b.ii) by increasing the flow of the flushing medium through the flow-through device according to (b.ii).

7. The method of claim 6, wherein the flushing process according to (iv) further comprises reducing feeding the liquid feed to the feed dosage device according to (ii) wherein said reducing feeding is carried out simultaneously with or after flushing according to (iv).

8. The method of claim 6, wherein the viscosity unstable liquid feed is a solidifiable liquid feed.

9. The method of claim 8, wherein the solidifiable liquid feed comprises a dinitrotoluene.

10. The method of claim 6, wherein at least during the flushing process according to (iv), the temperature of the flushing medium in the flushing medium tank according to (b.i) is higher than the melting point of the viscosity unstable liquid feed at the pressure inside the feed dosage unit according to (a), wherein at least during the flushing process according to (iv), the temperature of the flushing medium is from 1 to 40 K higher than the melting point of the viscosity unstable liquid feed at the pressure inside the feed dosage unit according to (a).

11. The method of claim 6, the feed supply unit being comprised in a chemical production unit, the production unit further comprising a reactor, wherein at least a part of the feed dosage device according to (a.i) is located inside the reactor, wherein during the flushing process according to (iv), the volume of flushing medium from the flushing medium tank according to (b.i) used for the flushing process is in the range of from 0.1 to 1% of the reaction volume of the reactor.

12. A method for improving the safety profile of the feeding of a viscosity unstable liquid feed to a reactor, the method comprising employing a feed supply unit according to claim 1.

13. A method for preventing the solidification of a viscosity unstable liquid feed, the method comprising employing a feed supply unit according to claim 1 for feeding said viscosity unstable liquid feed to a reactor.

* * * * *